May 12, 1964     C. J. WARD ETAL     3,132,438
FISH HOOK REMOVAL DEVICE
Filed Sept. 13, 1963
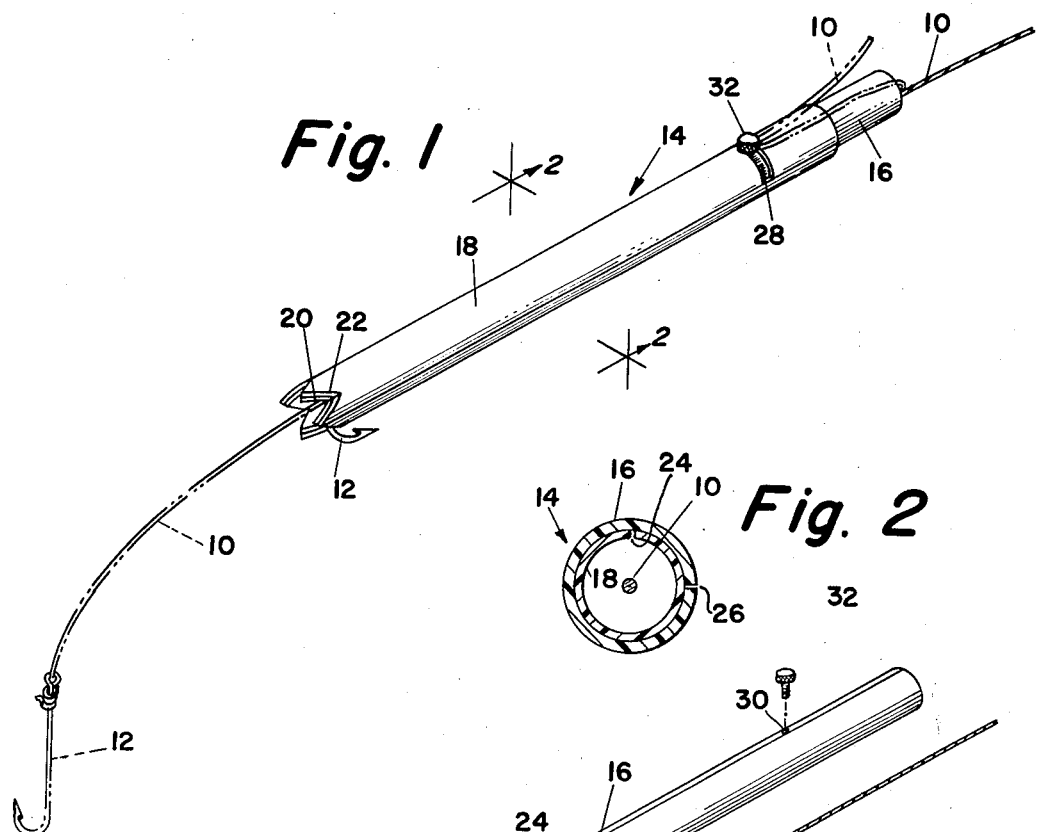
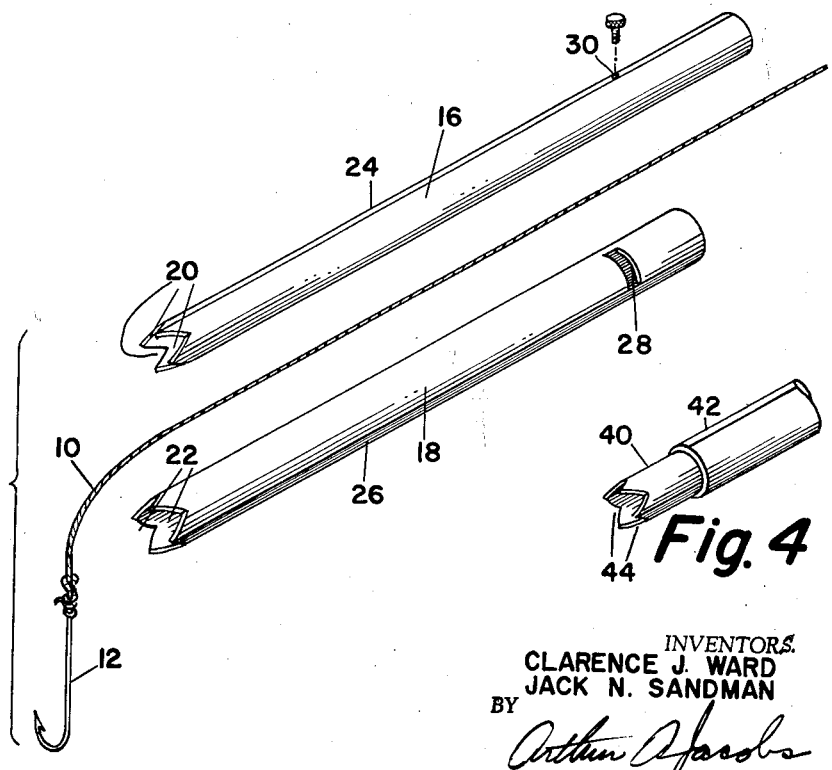
INVENTORS.
CLARENCE J. WARD
JACK N. SANDMAN
BY
*Arthur Jacobs*
ATTORNEY

United States Patent Office 3,132,438
Patented May 12, 1964

3,132,438
FISH HOOK REMOVAL DEVICE
Clarence J. Ward, 511 Leon Ave., Delran Township, and Jack N. Sandman, 46 Scott St., both of Riverside, N.J.
Filed Sept. 13, 1963, Ser. No. 308,759
1 Claim. (Cl. 43—53.5)

This invention relates to an attachment for fishing lines, and it particularly relates to a device for aiding the removal of the fish hook from a fish after it has been caught.

As any fisherman knows, when a fish has been caught on a hook it is often difficult to extricate the hook from the fish, especially when the hook has been swallowed and is deep in the gullet. In such case, it has heretofore been necessary to probe with the fingers in the throat of the fish, a process which is not only messy but also dangerous because the fingers are apt to become ensnared on the hook. Many persons who would, otherwise, engage in the sport of fishing are deterred therefrom only because of the problem of removing the fish from the hook.

It is one object of the present invention to overcome the above-mentioned difficulty by providing an attachment which enables the hook to be speedily and safely removed from a fish.

Another object of the present invention is to provide an attachment of the aforesaid type which is simple in construction, inexpensive to produce and easy to use.

Another object of the present invention is to provide an attachment of the aforesaid type which is easily applied to and removed from a fishing line but which is securely held thereon when necessary.

Other objects and many of the attendant advantages of this invention will be readily appreciated as the same becomes better understood by reference to the following description when read in conjunction with the accompanying drawings wherein:

FIG. 1 is a perspective view of an attachment embodying the present invention, the attachment being illustrated secured in operative position on a fishing line.

FIG. 2 is a cross-sectional view, somewhat enlarged, taken on line 2—2 of FIG. 1.

FIG. 3 is an exploded view of the device of FIG. 1.

FIG. 4 is a fragmentary perspective view of a modified form of the invention.

Referring now in greater detail to the various figures of the drawing wherein similar reference characters refer to similar parts, there is shown a fishing line 10, made of nylon or any other desirable material generally utilized for this purpose, to which is connected a fish hook 12 of the ordinary type. Mounted on the line 10 is an attachment, generally designated 14, which comprises an inner hollow tube 16 and an outer hollow tube or sleeve 18. The inner tube 16 is somewhat longer than the outer sleeve 18 and, of course, of just sufficiently less diameter than the outer sleeve to enable it to slidably and rotatably telescope within the outer sleeve.

The inner tube is provided at one end with a plurality of V-shaped notches or slots 20, here shown as four in number. The outer sleeve 18 is similarly provided with an equal number of V-shaped notches 22 at the corresponding end, the notches 22 being of substantially the same size and shape as the notches 20 so that they match when in overlying position, as in FIG. 1.

The inner tube 16 is also provided with a longitudinal slot 24 and the outer sleeve 18 is similarly provided with a longitudinal slot 26, each of these slots extending the complete extent of their respective members and being open at each end.

Intermediate its length, but closer to its rear end, the outer sleeve 18 is provided with a transverse slot 28 while the inner tube 16 is provided with a threaded hole 30 in a corresponding position. A set screw 32 is removably threaded in the hole 30 and extending through the slot 28. This set screw and slot arrangement permits the sleeve 18 to be rotated relative to the tube 16. This rotation is limited, however, by the arrangement whereby the slot 28 is of a length corresponding to a turn of 90 degrees plus the diameter of the stem of the set screw 32. This permits the outer sleeve 18 to rotate 90 degrees relative to the tube 16, whereby in one extreme position the slots 24 and 26 coincide, while in the second extreme position the slots 24 and 26 are 90 degrees offset from each other (as shown in FIG. 2). In either extreme position, however, since there are four notches 20, offset 90 degrees from each other, and four corresponding notches 22, offset 90 degrees from each other, the notches 20 and 22 will still mate.

If it is desired to disassemble the entire unit, this is accomplished by merely removing the set screw 32 and sliding the sleeve 18 longitudinally of the tube 16.

In applying the attachment 14 to a line, such as shown at 10, the set screw 32 is loosened and the sleeve 18 is rotated into the extreme position wherein the slot 26 in coincidence with the slot 24, after which the set screw is tightened. The line 10 is then laterally inserted through the coincident slots so that the hook 12 is outwardly of one end of the attachment (as indicated in dotted outline in FIG. 1) while the major portion of the line extends from the other end. The set screw is then again loosened and the sleeve 18 is rotated to the opposite extreme position. This automatically not only places the two slots 24 and 26 out of coincidence to lock the line against lateral movement out of the attachment but also places the notches 20 and 22 into overlying relationship with each other. The portion of the line extending from the rear end of the attachment (the left end as viewed in FIG. 1) is then pulled rearwardly to pull the hook against the front end of the attachment. When the hook reaches this position, it is automatically snapped into one of the overlapping pair of notches 20 and 22 (as shown in FIG. 1). When there is a fish caught on the hook, this movement places the attachment into a rigid association with the hook whereby the attachment is utilizable as a lever to pry the hook out of its connection with the fish. This lever arrangement not only permits greater force to be applied with less exertion but also eliminates the necessity of probing with the fingers. As soon as the hook is released, the set screw may be loosened and the sleeve rotated to bring the slots 24 and 26 into conjunction to permit easy removal of the line.

The above operation has been described in connection with a fishing procedure where it is not desirable to have the attachment on the line until after the fish is caught, as in casting or the like. However, in some instances, it may be desirable to retain the attachment on the line at all times so that it is not only always in position but may act as a sinker. In such circumstances, after the line 10 is inserted in the attachment, its hook end is permitted to swing free (as shown in dotted outline in FIG. 1) and the opposite portion of the line is looped around the upstanding portion of the set screw 32 (as shown in dotted outline in FIG. 1) before being allowed to swing free. This locks the hook in its free or accessible position where the attachment does not interefere with the play between the hook and fish. Thereafter, when the fish is hooked, the line is disconnected from the set screw and is then pulled rearwardly to bring the hook into the rigid position shown in full line in FIG. 1.

The tubular members 16 and 18 forming the attachment have here been illustrated as constructed of molded or extruded plastic material. However, it may, in some instances, be more desirable to construct these members of metal, wood, ceramics or any other feasible material.

For example, lead or iron may be preferred where the attachment is to be used as a sinker.

It is also within the scope of the present invention to construct the outer sleeve so that its front end is spaced rearwardly of the front end of the inner tube by at least the length of the notches. This is shown in FIG. 4 where the inner tube is designated 40, the outer sleeve 42 and the notches in the inner tube 44. In such construction, the end of the outer tube need not be notched since the notches 44 would always be open regardless of the degree of rotation of the outer sleeve. This simplifies the construction and makes it less expensive to produce. However, it deletes the reinforcement of the outer sleeve at the notched area which may often be important to sustain the impact of the loaded hook as it is snapped into place. The type of fishing being done and the type and size of the fish would therefore usually determine which type of attachment would be preferable.

Obviously many modifications and variations of the present invention are possible in the light of the above teachings. It is, therefore, to be understood that within the scope of the appended claim, the invention may be practiced otherwise than as specifically described.

The invention claimed is:

An attachment for a flexible fishing line having a hook on one end thereof comprising an inner hollow tube which is open at both ends, an outer hollow sleeve which is open at both ends, said inner tube being telescopically positioned within said outer sleeve for both rotatable and longitudinal movement relative to said outer sleeve, said inner tube having a longitudinal slot extending from end to end, said outer sleeve having a corresponding longitudinal slot extending from end to end, said slots being arranged to move into and out of juxtaposition with each other upon relative rotation of said tube and sleeve, said slots being constructed and arranged to provide lateral entrance therethrough of the fishing line when said slots are in juxtaposition and to lock said fishing line against lateral removal from said attachment when said slots are out of juxtaposition, removable means to releasably lock said tube and sleeve in various positions of relative rotation, said removable means comprising a set screw threadably secured to the inner tube and having a shank portion seated in a transverse slot in the outer sleeve, said removable means holding said inner tube against longitudinal movement relative to said outer sleeve while acting as a guide means for rotatable movement of said tube relative to said sleeve, said tube being longitudinally removable from said sleeve when said removable means is removed, said removable means forming an abutment to releasably engage a portion of said fishing line while said line is held in said attachment to prevent longitudinal movement of said line, and a plurality of V-shaped notches provided at one end of said inner tube and selectively at the corresponding end of said outer sleeve, said V-shaped notches alternating with V-shaped wedge portions to provide a continuously alternating V-shaped toothed edge wherein the slant edges of the teeth are constructed and arranged to guide the fishing line and the hook attached thereto into one of said V-shaped notches regardless of the relative positions of rotation of the tube and sleeve.

References Cited in the file of this patent

UNITED STATES PATENTS

| | | |
|---|---|---|
| 617,236 | Dougherty | Jan. 3, 1899 |
| 2,164,907 | Falkner | July 4, 1939 |
| 2,455,013 | Klinicki | Nov. 30, 1948 |
| 2,482,037 | Swaim | Sept. 13, 1949 |
| 2,644,268 | Klinicki | July 7, 1953 |

FOREIGN PATENTS

| | | |
|---|---|---|
| 1,129,317 | France | Sept. 3, 1956 |